US011050750B2

(12) United States Patent
Fang et al.

(10) Patent No.: US 11,050,750 B2
(45) Date of Patent: Jun. 29, 2021

(54) RECORDING AND VERIFICATION METHOD AND APPARATUS OF INTERNET OF THINGS DEVICE, AND IDENTITY AUTHENTICATION METHOD AND APPARATUS

(71) Applicant: Alibaba Group Holding Limited, Grand Cayman (KY)

(72) Inventors: Qiang Fang, Hangzhou (CN); Dapeng Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 25 days.

(21) Appl. No.: 16/428,060

(22) Filed: May 31, 2019

(65) Prior Publication Data

US 2019/0289006 A1 Sep. 19, 2019

Related U.S. Application Data

(63) Continuation of application No. PCT/CN2017/111803, filed on Nov. 20, 2017.

(30) Foreign Application Priority Data

Dec. 2, 2016 (CN) .......................... 201611111241.9

(51) Int. Cl.
*H04L 29/06* (2006.01)
*G06F 7/58* (2006.01)
(Continued)

(52) U.S. Cl.
CPC .......... *H04L 63/0884* (2013.01); *G06F 7/588* (2013.01); *H04L 9/0897* (2013.01);
(Continued)

(58) Field of Classification Search
CPC ... H04L 63/0884; H04L 9/0897; H04L 63/06; H04L 63/0876; G06F 7/588
(Continued)

(56) References Cited

U.S. PATENT DOCUMENTS 6,408,330 B1 6/2002 DeLaHuerga
9,099,152 B2 8/2015 Marcus
(Continued)

FOREIGN PATENT DOCUMENTS

CN 101873587 A 10/2010
CN 102065430 A 5/2011
(Continued)

OTHER PUBLICATIONS

Lee et al., "Secure DNS name autoconfiguration for IPv6 internet-of-things devices," doi: 10.1109/ICTC.2016.7763534, 2016, pp. 564-569. (Year: 2016).*

(Continued)

*Primary Examiner* — Peter C Shaw
(74) *Attorney, Agent, or Firm* — Lee & Hayes, P.C.

(57) ABSTRACT

A method and an apparatus for recording and verifying an Internet of Things (IoT) device, a method and an apparatus for identity authentication are provided. The recording and verification method includes receiving a recording request sent by a recording production line, the recording request being used for requesting an assignment of an identity identifier and a device key including a device private key and a device public key to an IoT device; verifying whether the recording request is legitimate, and assigning the identity identifier and the device key to the IoT device if affirmative; and sending the identity identifier and the device private key to the recording production line, so that the recording production line records the identity identifier and the device private key into the IoT device, thus improving the security (Continued)

of identity authentication of the IoT device, and reducing the cost of a platform side.

20 Claims, 8 Drawing Sheets

(51) Int. Cl.
*H04L 9/08* (2006.01)
*H04L 29/08* (2006.01)

(52) U.S. Cl.
CPC .............. *H04L 29/06* (2013.01); *H04L 29/08* (2013.01); *H04L 63/0442* (2013.01); *H04L 63/06* (2013.01); *H04L 63/0876* (2013.01); *H04L 67/12* (2013.01)

(58) Field of Classification Search
USPC .............................................................. 726/7
See application file for complete search history.

(56) References Cited

U.S. PATENT DOCUMENTS

| | | | |
|---|---|---|---|
| 9,849,364 B2 | 12/2017 | Tran et al. | |
| 9,882,877 B2 | 1/2018 | Wood | |
| 10,252,145 B2 | 4/2019 | Tran et al. | |
| 10,374,863 B2 | 8/2019 | Xu et al. | |
| 2009/0287837 A1 | 11/2009 | Felsher | |
| 2013/0159021 A1 | 6/2013 | Felsher | |
| 2016/0128043 A1* | 5/2016 | Shuman | H04W 4/029 370/331 |
| 2016/0205078 A1* | 7/2016 | James | H04L 9/006 713/171 |
| 2017/0359338 A1* | 12/2017 | Tschofenig | G06F 21/34 |
| 2018/0034913 A1* | 2/2018 | Matthieu | H04W 12/088 |
| 2019/0122086 A1 | 4/2019 | Basu | |
| 2019/0253432 A1 | 8/2019 | Ohtani et al. | |

FOREIGN PATENT DOCUMENTS

| | | |
|---|---|---|
| CN | 102571702 A | 7/2012 |
| CN | 102833066 A | 12/2012 |
| CN | 103281189 A | 9/2013 |
| CN | 103581153 A | 2/2014 |
| CN | 104778383 | 7/2015 |
| EP | 3062541 A1 | 8/2016 |

OTHER PUBLICATIONS

Pavithran et al. "Towards Creating Public Key Authentication for IoT Blockchain", IEEE, doi: 10.1109/ITT48889.2019.9075105, 2019, pp. 110-114. (Year: 2019).*
Won et al. "Decentralized Public Key Infrastructure for Internet-of-Things", IEEE, doi: 10.1109/MILCOM.2018.8599710, 2018, pp. 907-913. (Year: 2018).*
Translation of Search Report for corresponding PCT Application PCT/CN2017/111803, dated Jun. 8, 2018, a counterpart foreign application for U.S. Appl. No. 16/428,060, 2 pages.
Translation of Written Opinion for corresponding PCT Application PCT/CN2017/111803, dated Jun. 2, 2018, a counterpart foreign application for U.S. Appl. No. 16/428,060, 4 pages.
Translation of Written Opinion for corresponding CN Application No. 201611111241.9 , dated Apr. 9, 2020, a counterpart foreign application for U.S. Appl. No. 16/428,060 pp. 5.
The Partial Supplementary European Search Report dated May 20, 2020 for European Patent Application No. 17876168.0, 14 pages.
The Extended European Search Report dated Aug. 20, 2020 for European Patent Application No. 17876168.0, 13 pages.
Translation of Supplementary Search Report for corresponding CN Application No. 201611111241.9 , dated Sep. 2, 2020, a counterpart foreign application for U.S. Appl. No. 16/428,060 p. 1.
Wang et al., "Device Management Technology in LoT" cnki.net Periodical 12th ed, China, 2013.

* cited by examiner

RECORDING AND VERIFICATION METHOD AND APPARATUS OF INTERNET OF THINGS DEVICE, AND IDENTITY AUTHENTICATION METHOD AND APPARATUS

CROSS REFERENCE TO RELATED PATENT APPLICATIONS

This application claims priority to and is a continuation of PCT Patent Application No. PCT/CN2017/111803 filed on 20 Nov. 2017, and is related to and claims priority to Chinese Patent Application No. 201611111241.9, filed on 2 Dec. 2016 and entitled "Recording and Verification Method and Apparatus of Internet of Things Device, and Identity Authentication Method and Apparatus," which are hereby incorporated by reference in their entirety.

TECHNICAL FIELD

The present disclosure relates to the technical field of data processing of Internet of Things, and particularly to recording and verification methods and apparatuses of Internet of Things devices, and identity authentication methods and apparatuses.

BACKGROUND

The Internet of Things (IoT) is an interconnection network in which things are interconnected. Therefore, the core and foundation of the Internet of Things is the Internet, and is a network that is extended and expanded from the Internet. Moreover, a user end of the Internet of Things extends and expands to any objects for conducting information exchanges and communications, i.e., things meet.

IoT users use IoT devices for conducting information exchanges. In a process of information exchange between any IoT devices, each IoT device needs to use an identity to uniquely identify itself. In general, the identity and a private key used by the IoT device during communications are pre-recorded in the IoT device.

When recording is performed in IoT devices, identities and private keys may be maliciously stolen easily because certain types of associations exist between the IoT devices and because the identities and the private keys are directly recorded in storage spaces of the IoT devices. Furthermore, when subsequent communications are conducted between the IoT devices, a situation in which another device pretends to be an IoT device to request services from an Internet of Things service platform may occur. This cannot guarantee the security of the Internet of Things services and secure operations of the server platform side.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In implementations, the legality of a recording production line may first be verified by a recording and verification apparatus before identities and device private keys are recorded. The identities and the device private keys may be allocated to IoT devices by the recording and verification apparatus in a centralized manner upon successful verification, and the identities and device private keys may be directly recorded into a trusted execution environment when recording is performed on the IoT devices. Therefore, on the one hand, the recording and verification apparatus assigns the identities and the device private keys in a centralized manner after verifying the recording production line, and on the other hand, the identities and the device private keys are also recorded in the trusted execution environment to ensure the security of the identities and the device private keys.

Furthermore, when performing identity authentication of an Internet of Things device, an authorization code is generated using the IoT device. The authorization code includes not only a device private key recorded in a trusted execution environment, but also a random number generated by an identity authentication apparatus of a platform side. This ensures that only an IoT device that initiates an IoT service request can pass an identity authentication of the platform side, thus improving the security of IoT services and ensuring secure operations of the platform side.

Based thereupon, the present disclosure provides a recording and verification method of IoT identity information and an authentication method for an identity of an IoT device, which use a recording and verification apparatus to assign identity identifiers and public and private keys to IoT devices, and distribute the identity identifiers and the public and private keys to a recording production line to facilitate recording under trusted execution environments of the IoT devices in a centralized manner, thereby reducing the risk and possibility of the identity identifiers and the device private keys being stolen. Moreover, when an IoT device initiates an IoT service, an identity authentication apparatus on a platform side can verify an identity of the IoT device through an authorization code generated by the IoT device, and can also enhance the security of IoT identity authentication.

The present disclosure also provides a recording and verification apparatus, an identity authentication apparatus, and an identity authentication system for ensuring implementations and applications of the above method in practice.

In order to solve the above problem, the present disclosure discloses a method for verifying and recording of an Internet of Things device, which is applied to a recording and verification apparatus. The method includes: a recording and verification apparatus receiving a recording request sent by a recording production line, the recording request being used for requesting the recording and verification apparatus to assign an identity identifier and a device key to an IoT device to be recorded, and the device key including a device private key and a device public key; the recording and verification apparatus verifying whether the recording request is legitimate, and assigning the identity identifier and the device key to the IoT device to be recorded if affirmative; and the recording and verification apparatus sending the identity identifier and the device private key to the recording production line, so that the recording production line records the identity identifier and the device private key into the IoT device.

The device key includes the device private key and the device public key. After the recording production line records the identity identifier and the device private key into the IoT device, the method further includes: the recording and verification apparatus receiving a recording result returned by the recording production line, wherein the recording result is used for indicating a correspondence relationship between the IoT device and the identity identifier and the device private key that are recorded; and the recording and verification apparatus sending the recording result to an identity authentication apparatus, so that the identity authentication apparatus verifies whether the device private key of the IoT device is legitimate based on the recording result when authenticating the IoT device.

The recording and verification apparatus sending the identity identifier and the device private key to the recording production line, so that the recording production line records the identity identifier and the device private key into the IoT device, includes the recording and verification apparatus sending the identity identifier and the device private key to the recording production line, so that recording production line records the identity identifier and the device private key into the IoT device in a trusted execution environment, wherein the IoT device has a separate storage space that acts as the trusted execution environment.

The present disclosure discloses a method for recording an Internet of Things device, which is applied to a recording production line. The method includes sending a recording request to a recording and verification apparatus, wherein the recording request is used for requesting the recording and verification apparatus to assign an identity identifier and a device key to an IoT device to be recorded, and the device key includes a device private key and a device public key; recording the identity identifier and the device private key into the IoT device in response to the identity identifier and the device key sent by the recording and verification apparatus; and returning a recording result to the recording and verification apparatus, the recording result being used for indicating a correspondence relationship between the IoT device and the identity identifier and the device private key that are recorded.

The present disclosure discloses an identity authentication method for an Internet of Things device. The method is applied to an identity authentication apparatus in an identity authentication platform. The identity authentication platform is located in an identity authentication system, and the identity authentication system further includes an Internet of Things service platform and an Internet of Things device. The IoT service platform is used for providing an IoT service to the IoT device. The method includes the identity authentication apparatus generating a random number according to a request identifier in a request for random number generation in response to the request for random number generation sent by the IoT device to the identity authentication apparatus, the IoT device having an independent storage space which acts as a trusted execution environment, and a device private key and an identity identifier of the IoT device being recorded in the trusted execution environment; the identity authentication apparatus sending the random number to the IoT device, so that the IoT device generates an authorization code based on the random number and the device private key, and initiates a service request to an IoT service platform, the service request including a service content and the authorization code; the identity authentication apparatus verifying whether the authorization code is legitimate in response to the authorization code sent by the IoT service platform to the identity authentication apparatus; and the identity authentication apparatus confirming that an identity of the IoT device is legitimate if affirmative, and the identity authentication apparatus confirming that the identity of the IoT device is illegitimate if not.

The authorization code includes the device private key and the random number, and the identity authentication apparatus verifying whether the authorization code is legitimate in response to the authorization code sent by the IoT service platform to the identity authentication apparatus includes the identity authentication apparatus verifying whether the random number in the authorization code sent by the IoT service platform is consistent with the generated random number, and whether the device private key is the device private key included in a recording result sent by a recording and verification apparatus.

When the identity of the IoT device is legitimate, the method further includes the identity authentication apparatus sending a session key generation instruction to the IoT service platform, wherein the session key generation instruction is used for instructing the IoT service platform to generate a session key; and the identity authentication apparatus sending the session key returned by the IoT service platform to the IoT device, so that the IoT server platform and the IoT device conduct communications using the session key.

The method further includes the identity authentication apparatus deleting the recording result related to the identity identifier or the device private key that is leaked in an event that the identity identifier or the device private key is leaked from the trusted execution environment.

The method further includes the identity authentication apparatus deleting the identity identifier and the device private key recorded in the IoT device in an event that the identity identifier or the device private key is leaked from the trusted execution environment.

The present disclosure further includes a recording and verification apparatus for an Internet of Things device. The recording and verification apparatus includes a first receiving unit configured to receive a recording request sent by a recording production line, the recording request being used for requesting the recording and verification apparatus to assign an identity identifier and a device key to an IoT device to be recorded, and the device key including a device private key and a device public key; a license verification unit configured to verify whether the recording request is legitimate; an allocation unit configured to the identity identifier and the device key to the IoT device to be recorded if a result of the license verification unit is affirmative; and a first sending unit configured to send the identity identifier and the device private key to the recording production line, so that the recording production line records the identity identifier and the device private key into the IoT device.

The apparatus further includes a second receiving unit configured to a recording result returned by the recording production line, wherein the recording result is used for indicating a correspondence relationship between the IoT device and the identity identifier and the device private key that are recorded; and a second sending unit configured to send the recording result to an identity authentication apparatus, so that the identity authentication apparatus verifies whether the device private key of the IoT device is legitimate based on the recording result when authenticating the IoT device.

The first sending unit is specifically configured to send the identity identifier and the device private key to the recording production line, so that recording production line records the identity identifier and the device private key into the IoT device in a trusted execution environment, wherein the IoT device has a separate storage space that acts as the trusted execution environment.

The present disclosure also includes a recording apparatus for an Internet of Things device. The apparatus includes a third sending unit configured to send a recording request to a recording and verification apparatus, wherein the recording request is used for requesting the recording and verification apparatus to assign an identity identifier and a device key to an IoT device to be recorded, and the device key includes a device private key and a device public key; a recording unit configured to record the identity identifier and the device private key into the IoT device in response to the identity identifier and the device key sent by the recording and verification apparatus; and a result returning unit configured to return a recording result to the recording and verification apparatus, the recording result being used for indicating a correspondence relationship between the IoT device and the identity identifier and the device private key that are recorded.

The present disclosure further includes an identity authentication apparatus for the Internet of Things device. The identity authentication apparatus is integrated into an identity authentication platform, and the identity authentication platform is located in an identity authentication system. The identity authentication system further includes an IoT service platform and an IoT device. The IoT service platform is configured to provide an IoT service to the IoT device. The identity authentication apparatus includes a random number generation unit configured to generate a random number according to a request identifier in a request for random number generation in response to the request for random number generation sent by the IoT device to the identity authentication apparatus, the IoT device having an independent storage space which acts as a trusted execution environment, and a device private key and an identity identifier of the IoT device being recorded in the trusted execution environment; a random number sending unit configured to send the random number to the IoT device, so that the IoT device generates an authorization code based on the random number and the device private key, and initiates a service request to an IoT service platform, the service request including a service content and the authorization code; an authorization code verification unit configured to verify whether the authorization code is legitimate in response to the authorization code sent by the IoT service platform to the identity authentication apparatus; a first confirmation unit configured to confirm that an identity of the IoT device is legitimate if a result of the authorization code verification unit is positive; and a second confirmation unit configured to confirm that the identity of the IoT device is illegitimate if the result of the authorization code verification unit is negative.

The authorization code verification unit includes a verification subunit configured to verify whether the random number in the authorization code sent by the IoT service platform is consistent with the generated random number, and whether the device private key is the device private key included in a recording result sent by a recording and verification apparatus.

The apparatus further includes a fourth sending unit configured to send a session key generation instruction to the IoT service platform, wherein the session key generation instruction is used for instructing the IoT service platform to generate a session key; and a fifth sending unit configured to send the session key returned by the IoT service platform to the IoT device, so that the IoT server platform and the IoT device conduct communications using the session key.

The apparatus further includes a first deletion unit configured to delete the recording result related to the identity identifier or the device private key that is leaked in an event that the identity identifier or the device private key is leaked from the trusted execution environment.

The apparatus further includes a second deletion unit configured to delete the identity identifier and the device private key recorded in the IoT device in an event that the identity identifier or the device private key is leaked from the trusted execution environment.

The present disclosure further includes an identity authentication system for an Internet of Things device. The identity authentication system includes an identity authentication platform, an Internet of Things device, and an Internet of Things service platform. The identity authentication platform includes the foregoing recording and verification apparatus, and the foregoing identity authentication apparatus.

Compared with existing technologies, the present disclosure includes the following advantages.

In the embodiments of the present disclosure, a production license of a recording production line is first verified by a recording and verification apparatus before the recording production line records an IoT device. If the verification is passed, the IoT device is then assigned with an identity identifier, corresponding device public key and device private key. The identity identifier and the device private key are both recorded in a trusted execution environment of the IoT device. As such, the security of the recorded IoT device is greatly increased. At the same time, the recording production line can also request identity identifiers and device public and private keys of IoT devices in batches from the recording and verification apparatus, thereby improving the efficiency of recording. Furthermore, after the IoT device is recorded, the recording identity apparatus sends a recording result to an identity authentication apparatus for storage, thereby registering the recorded IoT device. This allows a subsequent identity verification to be successful only for a registered IoT device, and improve the security of a subsequent process of identity authentication of the IoT device.

In addition, a request identifier of an IoT service request is first generated before an IoT device initiates the service request. An identity authentication apparatus then generates a random number based on the request identifier. The IoT device generates a unique authorization code based on the random number returned by the identity authentication apparatus, thereby ensuring that only the IoT device that initiates the IoT request can pass the verification of the identity authentication apparatus. Therefore, the security of identity verification is also improved, ensuring the security of the IoT service is thereby guaranteed.

Apparently, any products implementing the present disclosure do not necessarily need to achieve all of the foregoing advantages at the same time.

BRIEF DESCRIPTION OF THE DRAWINGS

In order to more clearly describe technical solutions in the embodiments of the present disclosure, drawings used in the description of the embodiments will be briefly described herein. Apparently, the drawings in the following description represent only some embodiments of the present disclosure. Based on these drawings, one of ordinary skill can obtain other drawings without making any inventive effort.

DETAILED DESCRIPTION

The technical solutions in the embodiments of the present disclosure are clearly and completely described hereinafter with reference to the drawings in the embodiments of the present disclosure. Apparently, the described embodiments represent only some and not all of the embodiments of the present disclosure. All other embodiments obtained by one of ordinary skill in the art based on the embodiments of the present disclosure without making any inventive effort shall fall within the scope of protection of the present disclosure.

Definition of Terms

An Internet of Things device refers to a device that interacts with information in the Internet of Things (IoT), such as a smart appliance.

An identity identifier of an IoT device can uniquely identify the IoT device in the Internet of Things.

A Trusted Execution Environment (TEE) is a secure area on a main processor of an IoT device that guarantees the security, confidentiality, and integrity of codes and data stored in the secure area.

A device key includes a device public key and a device private key, with the device public key and the device private key being used symmetrically. When an IoT device encrypts data using the device private key, a server side uses the device public key to decrypt the data. Otherwise, when the server side encrypts data using the device public key, the IoT device decrypts the data using the device private key.

Figure 1:
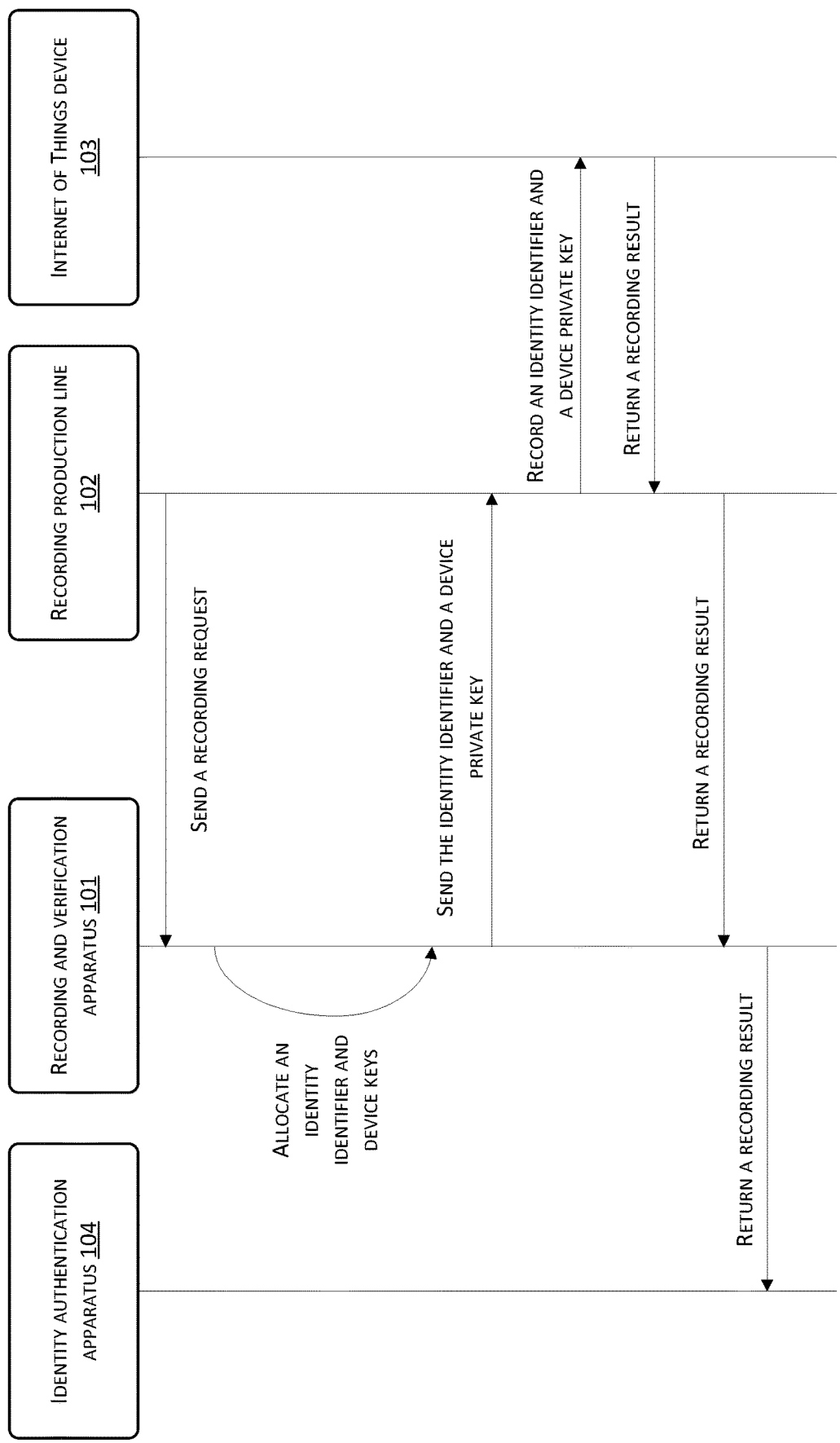
FIG. 1 shows an architectural diagram of a scenario of recording identity information of an Internet of Things device in accordance with the present disclosure.

In implementations, FIG. 1 is a framework diagram of a scenario of a recording and verification method of an Internet of Things device in a practical application according to the embodiments of the present disclosure.

A recording manufacturer needs to record device information of an IoT device when producing the IoT device. Generally, an assembly line used by the recording manufacturer to record the IoT device is called a recording production line. The recording production line 102 in FIG. 1 can send a recording license that is pre-agreed with a recording and verification apparatus 101 in FIG. 1 to the recording and verification apparatus through a recording request, requesting the recording and verification apparatus 101 to assign an identity identifier, a device public key, and a device private key to an IoT device 103 to be recorded. The identity identifier can uniquely identify the IoT device in the Internet of Things, and the device public key and the device private key are used symmetrically. When the IoT device encrypts data using the device private key, a server side uses the device public key to decrypt the data. Otherwise, when the server side encrypts data using the device public key, the IoT device decrypts the data using the device private key. The recording and verification apparatus then verifies the recording license. If legitimate, the recording and verification apparatus assigns an identity identifier, a device public key and a device private key to the IoT device to be recorded, and send thereof to the recording production line. The recording production line records the identity identifier and the device private key into the IoT device. After successful recording, a logistics network device will return a recording result, for example, what information of device private key is recorded in which IoT device, to the recording production line. The recording production line then sends the recording result to the recording and verification apparatus 101. The recording and verification apparatus 101 can also transmit the recording result to an identity authentication apparatus 104 to register the successfully-recorded IoT device in the identity authentication apparatus 104.

Figure 2:
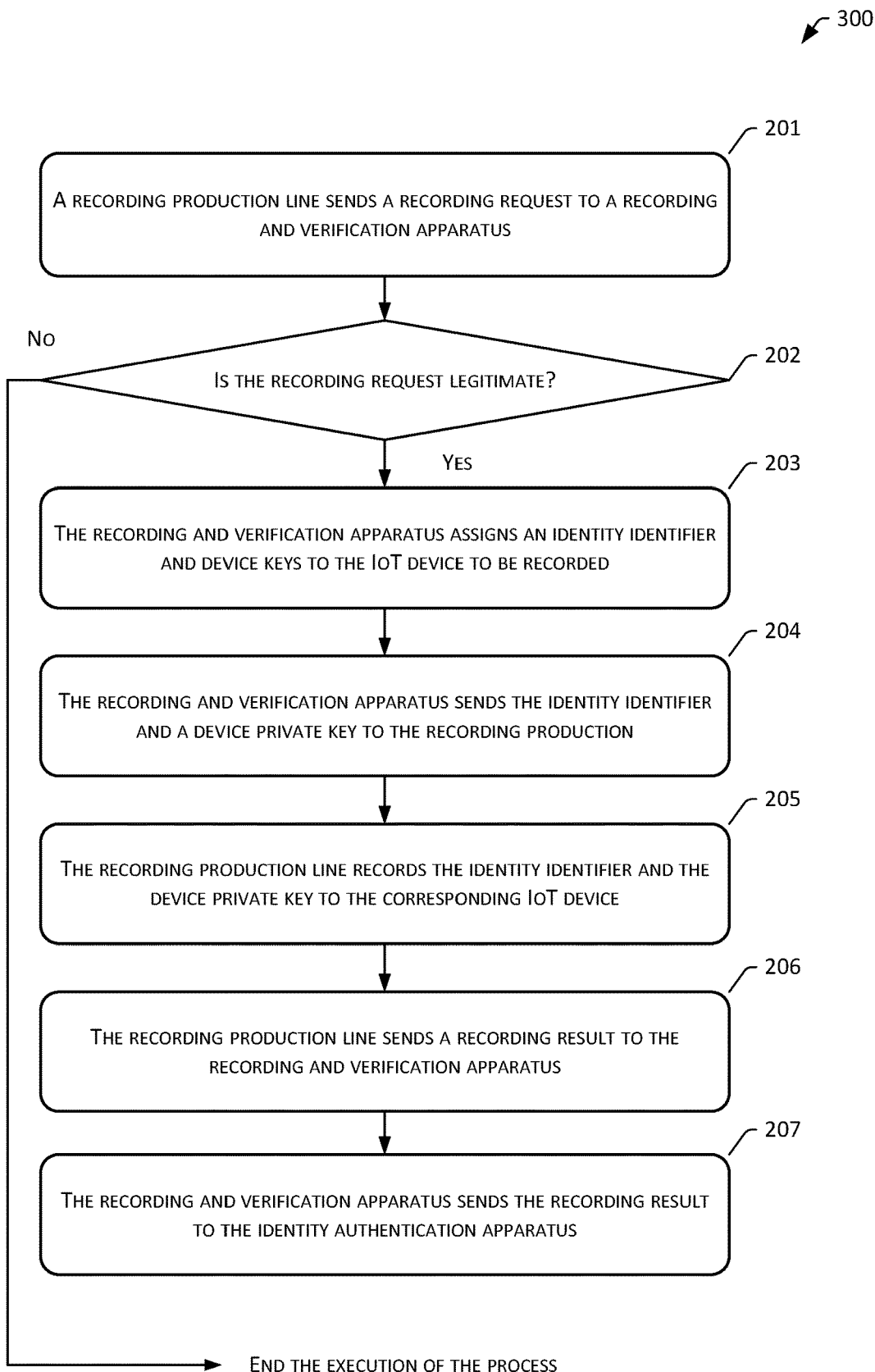
FIG. 2 shows a flowchart of an embodiment of a method for recording and verification of an Internet of Things device in accordance with the present disclosure.

A recording process in the embodiments of the present disclosure is described in detail hereinafter based on the framework diagram of the recording scenario introduced in FIG. 1. FIG. 2 shows a flowchart of an embodiment of a method 200 for verifying and recording of an Internet of Things device of the present disclosure. The method 200 may include the following operations.

Operation 201: A recording production line sends a recording request to a recording and verification apparatus.

In this operation, after a recording production line obtains a recording license, the recording license can be included in a recording request and sent to a recording and verification apparatus. The recording request is used for requesting the recording and verification apparatus to assign an identity identifier, and a pair of device public key and a device private key to an IoT device to be recorded. The recording license is a serial number for a recording manufacturer authorizes the recording production line to record into the IoT device. The serial number can be composed of characters and/or numbers, for example, "AKJ20151012", etc. "AKJ" can represent the recording manufacturer's code, and "20151012" is used for indicating a time, etc. The recording and verification apparatus can pre-store a legitimate recording license "AKJ1234" of the recording production line, so as to verify the legitimacy of a received recording license.

It can be understood that, in practical applications, a recording request may be an application for allocation of identity identifiers and device keys to a plurality of IoT devices in batch at one time. As such, an allocation of IoT devices in batch can be implemented under a circumstance that the number of communications between the recording and verification apparatus and the recording production line is reduced. Apparently, a recording request can apply for an allocation of identity identifier and a device key to a single IoT device.

Operation 202: The recording and verification apparatus verifies whether the recording request is legitimate, and the process proceeds to operation 203 if affirmative.

The recording and verification apparatus can implement verification of the legitimacy of the recording request by verifying the legitimacy of a recording license in the recording request. For example, a received recording license that is sent by the recording production line can be compared based on a pre-stored recording license. The recording license in the recording request is considered to be legitimate if they are consistent, and is considered to be illegitimate if not. The recording and verification apparatus can use a separate database to store recording licenses, for example, storing correspondence relationships between each manufacturer and respective recording license(s) permitted thereby. For example, a recording license number extracted from a recording request by the recording and verification apparatus is "AKJ1234", and the recording request is sent by a recording production line of a recording manufacturer having a code of "AKJ". The recording and verification apparatus can find a recording license number corresponding to "AKJ" from the database as "AKJ1234". In this case, it is considered to be legitimate. If they are not consistent, it is considered to be illegitimate, and the recording and verification apparatus can deny the recording request sent by the recording production line, and no longer assign any identity identifier, device public key and private key to the IoT device to be recorded.

Operation 203: The recording and verification apparatus assigns an identity identifier and device keys to the IoT device to be recorded.

The recording and verification apparatus then assigns a unique identity identifier to the IoT device to be recorded, and a pair of device keys which include a device public key and a device private key. Specifically, the recording and verification apparatus may randomly generate a different serial number for each IoT device according to a method for producing unique serial numbers, or assign a different serial number to each IoT device according to a preset manner. For example, the recording and verification apparatus may maintain an identity information table in which a batch of identity identifiers to be assigned and respective device keys (including a device public key and a device private key) corresponding to each identity identifier. The recording and verification apparatus can sequentially obtain an identity identifier and device keys from the information table to be allocated to the IoT device.

In practical applications, the recording production line can send the recording request to the recording and verification apparatus by means of a digital signature. In this case, the recording and verification apparatus can also verify the signature after receiving the recording request of digital signature, and consider the recording license to be legitimate only if the signature is valid.

Operation 204: The recording and verification apparatus sends the identity identifier and a device private key to the recording production line.

After assigning the identity identifier, the device public key, and the device private key are assigned, the recording and verification apparatus sends the identity identifier and the device private key to the recording production line.

Operation 205: The recording production line records the identity identifier and the device private key to the corresponding IoT device.

The recording production line can record the identity identifier and device private key into the IoT device. Specifically, the recording and verification apparatus can record the identity identifier and the device private key to a place that is set aside as a trusted execution environment in the IoT device. The Trusted Execution Environment (TEE) is a security zone on a main processor of the IoT device, which can ensure the security, confidentiality and integrity of codes and data that are loaded in the security zone. TEE can provide an isolated execution environment, and security features that are provided include isolated execution, integrity of trusted applications, confidentiality of trusted data, and secure storage, etc.

Operation 206: The recording production line sends a recording result to the recording and verification apparatus.

A recording result of which identity identifier and device private key is recorded in which IoT device is sent to the recording and verification apparatus. The recording result can be, for example, an identity of identifier ("123456789") recorded in the IoT device A, and the private key ("XKNHJH") of the device.

Operation 207: The recording and verification apparatus sends the recording result to the identity authentication apparatus.

The recording and verification apparatus then sends the recording result to the identity authentication apparatus, and the identity authentication apparatus stores the recording result, thereby registering the successfully-recorded IoT device on a platform side.

As can be seen, in the embodiments of the present disclosure, a production license of a recording production line is first verified by a recording and verification apparatus before the recording production line records an IoT device. If the verification is passed, the IoT device is then assigned with an identity identifier, corresponding device public key and device private key. The identity identifier and the device private key are both recorded in a trusted execution environment of the IoT device. As such, the security of the recorded IoT device is greatly increased. At the same time, the recording production line can also request identity identifiers and device public and private keys of IoT devices in batches from the recording and verification apparatus, thereby improving the efficiency of recording. Furthermore, after the IoT device is recorded, the recording identity apparatus sends a recording result to an identity authentication apparatus for storage, thereby registering the recorded IoT device. This allows a subsequent identity verification to be successful only for a registered IoT device, and improve the security of a subsequent process of identity authentication of the IoT device.

Figure 3:
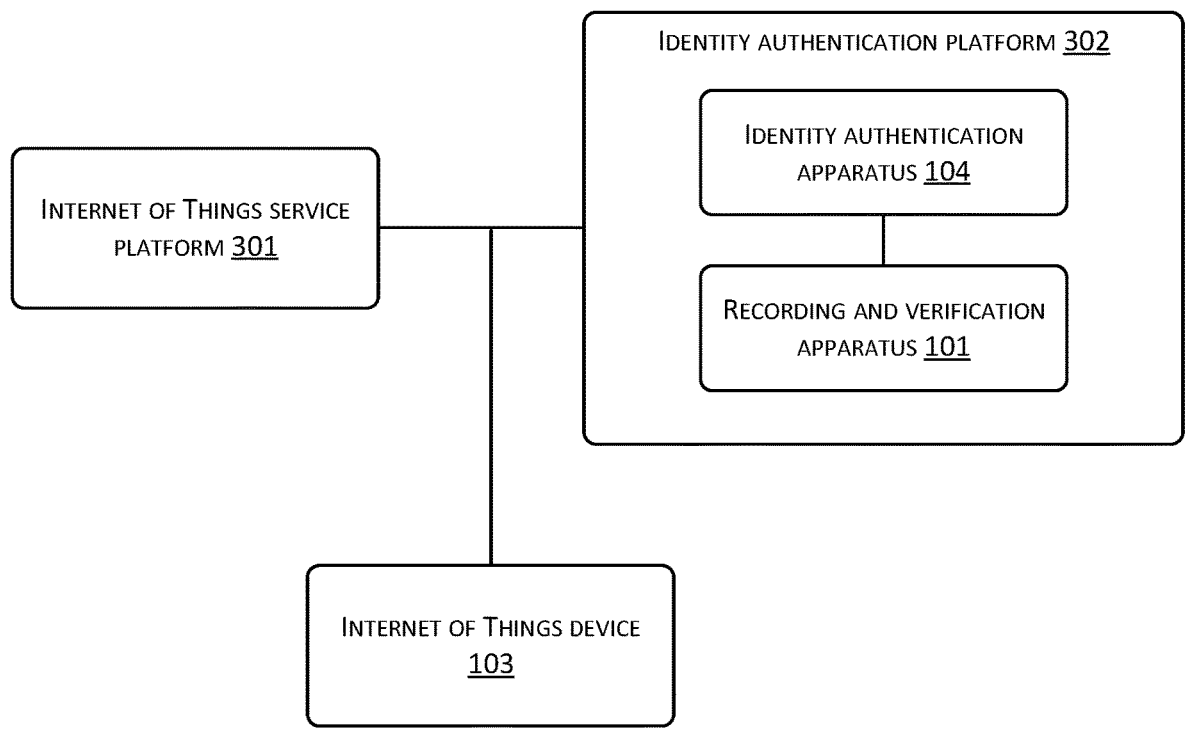
FIG. 3 shows an architectural diagram of a scenario of an identity authentication of an Internet of Things device in accordance with the present disclosure.

Referring to FIG. 3, a framework diagram of a scenario of an Internet of Things identity authentication method in a practical application according to the present disclosure is shown. In FIG. 3, an identity authentication system may include an IoT service platform 301 and an identity authentication platform 302, and an IoT device 103. The identity authentication platform 302 may include an identity authentication apparatus 104 and a recording and verification apparatus 101. A plurality of IoT devices 103 may exist. After recording a device private key and an identity identifier to the IoT device 103, the device verification key 101 sends a recording result to the identity authentication apparatus 104, so that the successfully-recorded IoT device 103 is registered in the identity authentication apparatus 104. The identity authentication apparatus 104 can store the recording result.

The IoT service platform 301 may be a third-party platform capable of providing Internet of Things (IoT) services to the IoT device 103, for example, a shopping platform capable of communicating with the IoT device 103 to implement online ordering of the IoT device 103, a manufacturer, etc. The IoT device 103 may be a smart home appliance produced by a smart home appliance manufacturer, such as a smart refrigerator, etc., and may initiate a service request for online ordering of a certain food to the IoT service platform 301 in response to detecting a lack of the food in the refrigerator. The identity authentication platform 302 verifies an identity of the IoT device 103 when the IoT device 103 requests an IoT service from the IoT service platform 301, and allows the IoT service platform 301 to provide the IoT service to the IoT devices if the identity is legitimate.

Figure 4A:
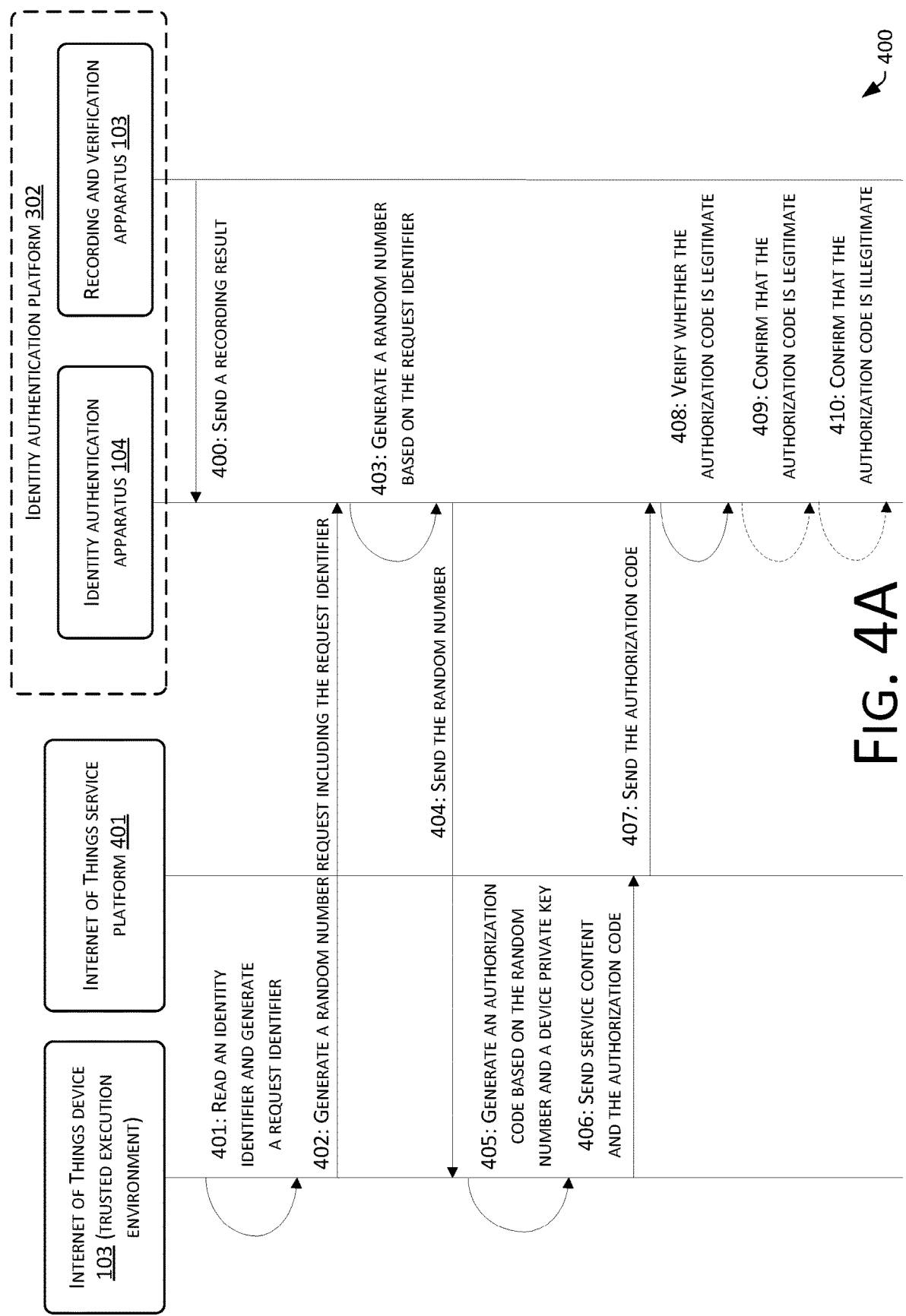
FIGS. 4A and 4B show flowcharts of an embodiment of an identity authentication method of an Internet of Things device in accordance with the present disclosure.
Figure 4B:
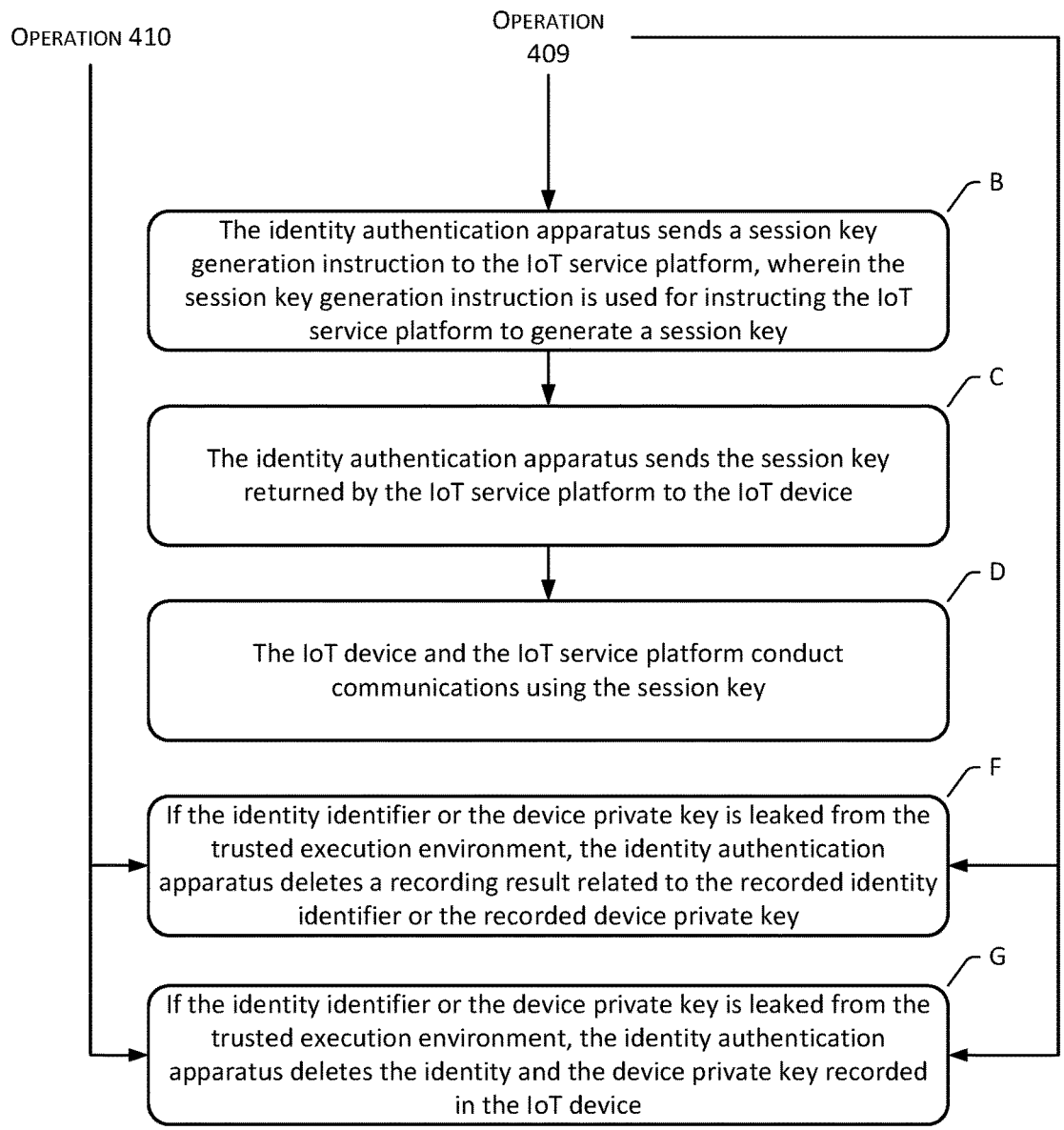

Based on the scenario framework diagram shown in FIG. 3, FIGS. 4A and 4B show a flowchart of an embodiment of a method 400 for identity authentication of an Internet of Things device. The method is applied to an identity authentication apparatus in an identity authentication platform. The authentication platform is located in an identity authentication system, and the identity authentication system further includes an Internet of Things service platform and an Internet of Things device. The Internet of Things service platform is used for providing Internet of Things services to the Internet of Things device. The method 400 may include the following operation.

Operation 400: The identity verification device stores a correspondence relationship between the IoT device and an identity identifier and a device private key that are recorded in response to a recording result sent by the recording and verification apparatus.

In implementations, in response to receiving a recording result returned by a recording production line, the recording and verification apparatus sends the recording result to the identity verification device connected thereto. The identity verification device can store the recording result. The recording result includes an identity identifier of an IoT device and a correspondence relationship between device private keys recorded in the IoT device.

In implementations, this operation can also be performed at any operation before the identity verification device performs verification on the IoT device at operation 408, and an order thereof does not affect implementations of the present embodiment.

Operation 401: The IoT device reads the identity identifier from a trusted execution environment, and generates a request identifier for identifying a current IoT service request of the IoT device.

In implementations, the IoT device reads the recorded identity identifier from the trusted execution environment, to allow a subsequent generation of an authorization code corresponding to the identity identifier therefor. First, the IoT device can generate a request identifier (sid) for an IoT service request. Specifically, the request identifier can uniquely identify the IoT service request initiated by the IoT device, for example, a string or a serial number consisting of letters and/or numbers, etc.

Operation 402: The IoT device sends a request for random number generation to the identity authentication apparatus in the identity authentication platform, wherein the random number request includes the request identifier.

The IoT device puts the generated request identifier into the request for random number generation, which is sent to the identity authentication apparatus in the identity authentication platform. The request for random number generation is simultaneously used for requesting the identity authentication apparatus to generate a random number for the current IoT service request.

Operation 403: The identity authentication apparatus generates a random number according to the request identifier.

After receiving the request for random number generation sent by the IoT device, the identity authentication apparatus generates a random number for the IoT device according to the request identifier. Specifically, the random number may be generated using a clock and the request identifier+a timestamp. An example is AJKBJ010-20160508, in which "AJKBJ010" is a request identifier used for uniquely identifying an IoT request initiated by one device, and "20160508" is the time.

Operation 404: The identity authentication apparatus sends the generated random number to the IoT device.

The identity authentication apparatus sends the generated random number to the IoT device.

Operation 405: The IoT device generates an authorization code corresponding to the identity identifier according to the random number and the device private key.

The IoT device generates an authorization code for the IoT service request based on the received random number and the device private key read from the trusted execution environment. Specifically, the authorization code may be, for example, information obtained by digitally signing the device private key and the random number. Since the random number is generated by the request identifier, a frame of the authorization code can be obtained by the following method: authorization code=signature function (device private key, random number+request identifier). The authorization code includes information of the device private key, the request identifier, and the random number, and can be used for identifying the legitimacy of the IoT device that currently initiates the IoT service request.

Operation 406: The IoT device initiates a service request to the IoT service platform, wherein the service request may include service content and the authorization code.

After the authorization code is generated, the IoT device initiates a service request to the IoT service platform, wherein the service request includes service content that is needed from the IoT service platform, and the generated authorization code. Specifically, the authorization code may be transmitted after being digitally signed by a public key of the IoT service platform. The service content is used for indicating a IoT service that the IoT device needs to be provided by the IoT service platform. For example, a certain smart refrigerator may request an online product shopping service from the IoT service platform.

Operation 407: The IoT service platform sends the authorization code in the service request to the identity authentication apparatus.

The IoT service platform can decrypt the service request using its own private key upon receiving the service request to obtain the authorization code and the service content. In the present embodiment, before the IoT service platform provides the IoT service represented by the service content to the IoT device, the authorization code needs to be sent to the identity authentication apparatus for identity authentication of the IoT device.

Operation 408: The identity authentication apparatus verifies whether the authorization code is legitimate. If affirmative, the process proceeds to operation 409. If not, the process proceeds to operation 410.

After receiving the authorization code, the identity authentication apparatus verifies information such as a device private key, a random number, and a request identifier included in the authorization code. Specifically, for the device private key, the identity authentication apparatus may check whether the device private key is a device private key that has been sent by the recording and verification apparatus and corresponds to the identity of the IoT device, i.e., whether the IoT device corresponding to the device private key is previously registered in the identity authentication apparatus. For the random number, the identity authentication apparatus verifies whether it is consistent with the random number generated at operation 403. For the request identifier, the identity authentication apparatus verifies whether it is consistent with the received request identifier that is sent by the IoT device at operation 402.

Operation 409: The identity authentication apparatus confirms that an identity of the IoT device is legitimate.

If the device private key is registered and the random number and the request identifier are also consistent, the identity of the IoT device is legitimate. In practical applications, in order to ensure the security and accuracy of a verification result, operation 409 is performed when verification of the device private key, the random number, and the request identifier is passed.

Operation 410: The identity authentication apparatus confirms that an identity of the IoT device is illegitimate.

If the device private key is not registered, or the random number or request identifier is not consistent, then the identity of the IoT device is illegitimate. In practical applications, if verification of one of the device private key, the random number, or the request identifier fails, the identity of the IoT device can be determined to be illegitimate. As such, the security of identity authentication can be further improved.

In practical applications, if the identity of the IoT device is legitimate, after operation 409, the method may further include the following operations.

Operation B: The identity authentication apparatus sends a session key generation instruction to the IoT service platform, wherein the session key generation instruction is used for instructing the IoT service platform to generate a session key.

After verifying that the identity of the IoT device is legitimate, the identity authentication apparatus sends an instruction to the IoT service platform for generating a session key, triggers the IoT service platform to generate a session key. The session key can be used for subsequent secure communications between IoT devices.

Operation C: The identity authentication apparatus sends the session key returned by the IoT service platform to the IoT device.

After the session key is produced, the IoT service platform sends the session key to the identity authentication apparatus. The identity authentication apparatus then sends the session key to the IoT device of which the legitimacy of the identity has been successful verified. Specifically, the identity authentication apparatus may encrypt the session key using the device public key of the IoT device and then send the encrypted session key.

Operation D: The IoT device and the IoT service platform conduct communications using the session key.

The IoT device decrypts the encrypted session key with its own device private key, thereby obtaining the session key for conducting communications with the IoT service platform. The IoT service platform can provide a requested IoT service thereof to the IoT device through a secure communication that has been established.

In practical applications, after operation 409 or operation 410, the method 400 may further include the following operation.

Operation F: If the identity identifier or the device private key is leaked from the trusted execution environment, the identity authentication apparatus deletes a recording result related to the recorded identity identifier or the recorded device private key.

In practical applications, situations in which the identity identifier or the device private key recorded in the IoT device is leaked may occur. In this case, the identity identifier and the device private key are no longer secure. Therefore, the identity authentication apparatus deletes a recording result related to the leaked identity identifier or device private key that is stored.

In practical applications, after operation 409 or operation 410, the method 400 may further include the following operation.

Operation G: If the identity identifier or the device private key is leaked from the trusted execution environment, the identity authentication apparatus deletes the identity and the device private key recorded in the IoT device.

In addition, if the identity identifier or the device private key recorded in the Internet IoT device is leaked, the identity authentication apparatus may also delete the leaked identity identifier and device private key that are recorded in the IoT device.

In implementations, before initiating a current IoT service request, an IoT device first generates a request identifier of the service request, and then requests an identity authentication apparatus to generate a random number according to the request identifier. The IoT device then generates a unique authorization code based on the random number returned by the identity authentication apparatus. This therefore ensures that only the IoT device that initiates the IoT request can pass the verification of the identity authentication apparatus, thereby improving the security of identity authentication as compared with the existing technologies, and ensuring the security of IoT services.

For the sake of simple description, the foregoing method embodiments are all expressed as a series of action combinations. One skilled in the art should understand, however, that the present disclosure is not limited by the described orders of actions, because these operations can be performed in other orders or in parallel according to the present disclosure. Moreover, one skilled in the art should also understand that the embodiments described in the specification are all preferred embodiments, and actions and modules involved therein may not be necessarily required by the present disclosure.

Figure 5:
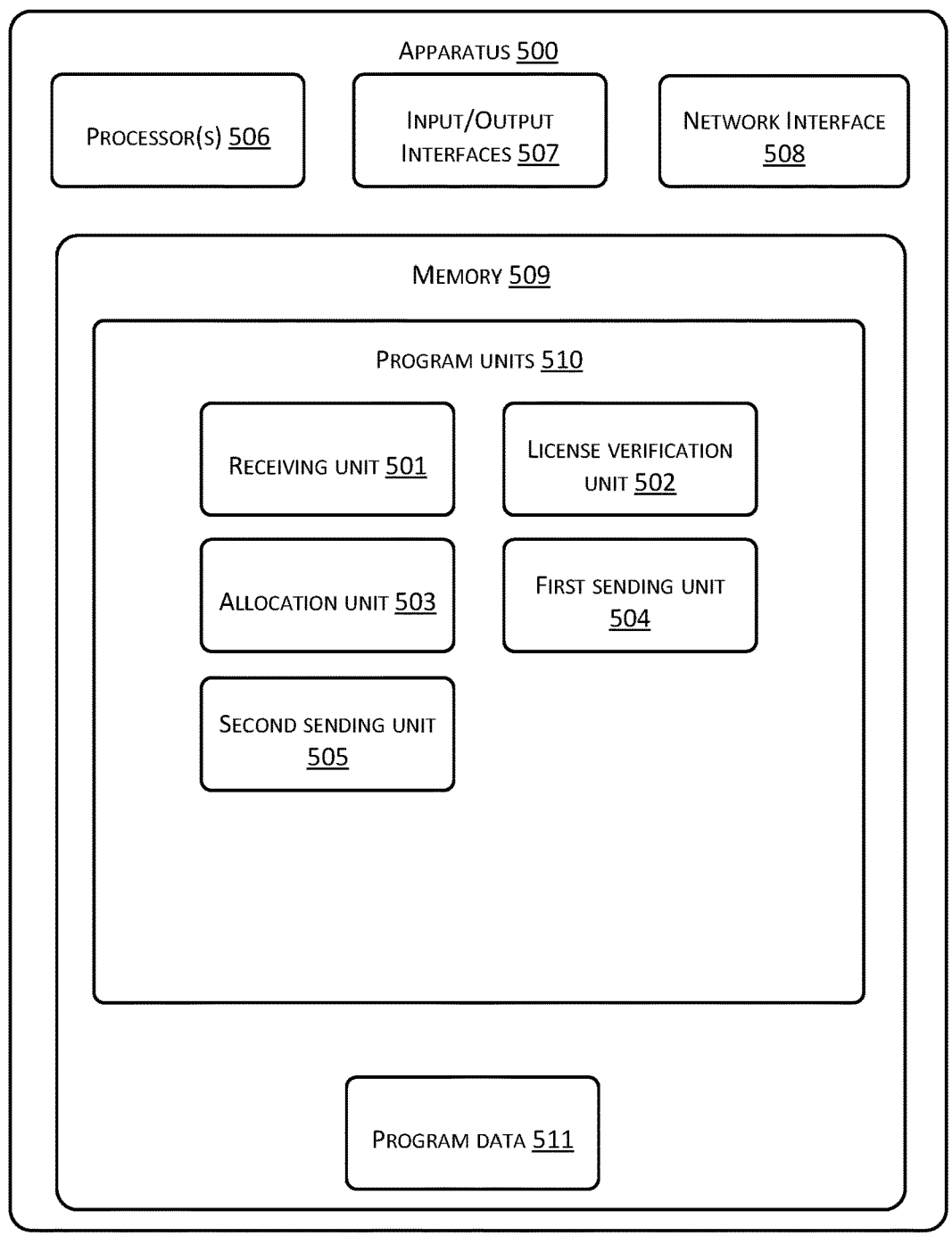
FIG. 5 shows a structural block diagram of an embodiment of a recording and verification apparatus in accordance with the present disclosure.

Corresponding to the method provided by the method embodiment of recording and verification of an Internet of Things device of the present disclosure, referring to FIG. 5, the present disclosure further provides an embodiment of an apparatus 500 of recording and verification of an IoT device. In implementations, the apparatus 500 may include one or more computing devices. In implementations, the apparatus 500 may be a part of one or more computing devices, e.g., implemented or run by the one or more computing devices. In implementations, the one or more computing devices may be located in a single place or distributed among a plurality of network devices over a network.

By way of example and not limitation, the recording and verification apparatus 500 may include a receiving unit 501 configured to receive a recording request sent by a recording production line, wherein the recording request is used for requesting the recording and verification apparatus to assign an identity identifier and a device key to an IoT device to be recorded, the device key including a device private key and a device public key; a license verification unit 502 configured to verify whether the recording request is legitimate; an allocation unit 503 configured to allocate the identity identifier and the device key to the IoT device to be recorded if a result of the license verification unit is affirmative; and a first sending unit 504 configured to send the identity identifier and the device private key to the recording production line, so that the recording production line records the identity identifier and the device private key into the corresponding Internet of Things device.

In practical applications, the recording and verification apparatus 500 may further include a second sending unit 505 configured to send a recording result returned by the recording production line to an identity authentication apparatus, wherein the recording result is used for indicating a correspondence relationship between the IoT device and the identity identifier and the device private key that are recorded.

In implementations, before the recording production line performs recording on the IoT device, the recording and verification apparatus first performs verification on a production license of the recording production line. If the verification is passed, the identity identifier, the device public key, and the device private key are allocated to the IoT device. The identity identifier and the device private key are recorded in a trusted execution environment of the IoT device, which greatly increases the security of the recorded IoT device. Furthermore, the recording production line can also request identity identifiers of IoT devices and device public and private keys in batch from the recording and verification apparatus, thus improving the efficiency of recording. Moreover, after recording is performed on the IoT device, the recording and verification apparatus sends a recording result to the identity authentication apparatus for storage, thereby registering the recorded IoT device. This allows only the registered IoT device to pass a subsequent identity authentication, thus improving the security of a subsequent process of identity authentication of the IoT device.

In implementations, the apparatus 500 may include one or more processors 506, an input/output (I/O) interface 507, a network interface 508, and memory 509.

The memory 509 may include a form of computer readable media such as a volatile memory, a random access memory (RAM) and/or a non-volatile memory, for example, a read-only memory (ROM) or a flash RAM. The memory 509 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 509 may include program units 510 and program data 511. The program units 510 may include one or more units as described in the foregoing description and shown in FIG. 5.

Figure 6:
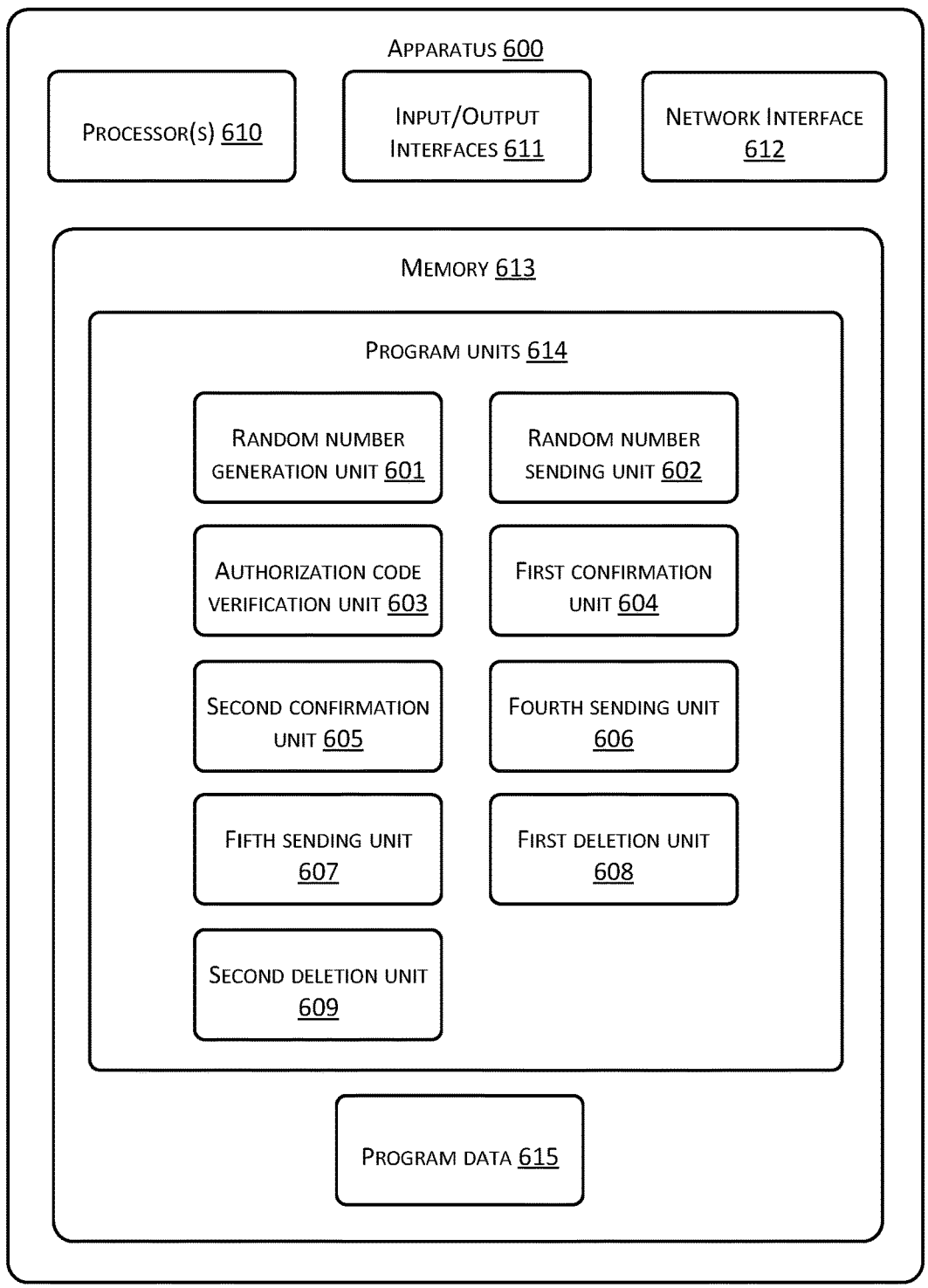
FIG. 6 shows a structural block diagram of an identity authentication apparatus in accordance with the present disclosure.

Corresponding to the method provided by the method embodiment for authenticating an Internet of Things device of the present disclosure, as shown in FIG. 6, the present disclosure further provides an identity authentication apparatus 600 for an Internet of Things device. In the present embodiment, the identity authentication apparatus 600 is integrated into an identity authentication platform. The identity authentication platform is located in an identity authentication system. The identity authentication system further includes an Internet of Things service platform and an Internet of Things device. The Internet of Things service platform is used for providing Internet of Things services to the IoT device. In implementations, the apparatus 600 may include one or more computing devices. In implementations, the apparatus 600 may be a part of one or more computing devices, e.g., implemented or run by the one or more computing devices. In implementations, the one or more computing devices may be located in a single place or distributed among a plurality of network devices over a network.

By way of example and not limitation, the identity authentication apparatus 600 may include a random number generation unit 601 configured to generate a random number according to a request identifier in a request for random number generation in response to the request for random number generation sent by the IoT device to the identity authentication apparatus, the IoT device having an independent storage space which acts as a trusted execution environment, and a device private key and an identity identifier of the IoT device being recorded in the trusted execution environment; a random number sending unit 602 configured to send the random number to the IoT device, so that the IoT device generates an authorization code based on the random number and the device private key, and initiates a service request to an IoT service platform, the service request including a service content and the authorization code; and an authorization code verification unit 603 configured to verify whether the authorization code is legitimate in response to the authorization code sent by the IoT service platform to the identity authentication apparatus.

The authorization code verification unit 603 may include a verification subunit configured to verify whether the random number in the authorization code sent by the IoT service platform is consistent with the generated random number, and whether the device private key is the device private key included in a recording result sent by a recording and verification apparatus.

A first confirmation unit 604 is configured to confirm that an identity of the IoT device is legitimate if a result of the authorization code verification unit is positive.

A second confirmation unit 605 is configured to confirm that the identity of the IoT device is illegitimate if the result of the authorization code verification unit is negative.

In implementations, the identity authentication apparatus 600 may further include a fourth sending unit 606 configured to send a session key generation instruction to the IoT service platform, wherein the session key generation instruction is used for instructing the IoT service platform to generate a session key; and a fifth sending unit 607 configured to send the session key returned by the IoT service platform to the IoT device, so that the IoT server platform and the IoT device conduct communications using the session key.

In implementations, the identity authentication apparatus 600 may further include a first deletion unit 608 configured to delete the recording result related to the identity identifier or the device private key that is leaked in an event that the identity identifier or the device private key is leaked from the trusted execution environment.

In implementations, the identity authentication apparatus 600 may further include a second deletion unit 609 configured to delete the identity identifier and the device private key recorded in the IoT device in an event that the identity identifier or the device private key is leaked from the trusted execution environment.

In implementations, before initiating a current IoT service request, an IoT device first generates a request identifier of the service request, and then requests an identity authentication apparatus to generate a random number according to the request identifier. The IoT device then generates a unique authorization code based on the random number returned by the identity authentication apparatus. This therefore ensures that only the IoT device that initiates the IoT request can pass the verification of the identity authentication apparatus, thereby improving the security of identity authentication as compared with the existing technologies, and ensuring the security of IoT services.

In implementations, the apparatus 600 may include one or more processors 610, an input/output (I/O) interface 611, a network interface 612, and memory 613. The memory 613 may include a form of computer readable media such as the one described in the foregoing description.

In implementations, the memory 613 may include program units 614 and program data 615. The program units 614 may include one or more units as described in the foregoing description and shown in FIG. 6.

Figure 7:
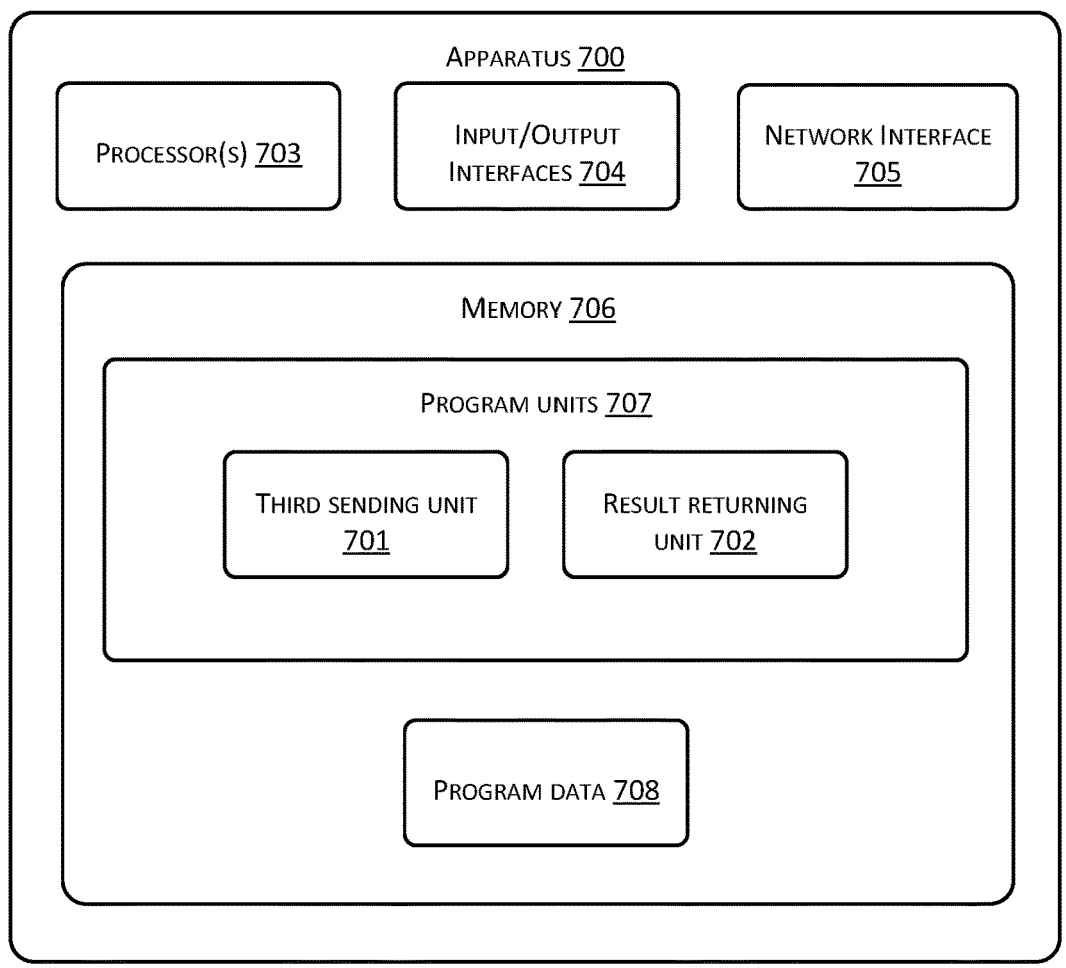
FIG. 7 shows a structural block diagram of a recording apparatus 700 for an Internet of Things device in accordance with the present disclosure.

Corresponding to the method provided by the method embodiment of recording an Internet of Things device of the present disclosure, the present disclosure further provides another embodiment of a recording apparatus 700 for an Internet of Things device as shown in FIG. 7. In implementations, the apparatus 700 may include one or more computing devices. In implementations, the apparatus 700 may be a part of one or more computing devices, e.g., implemented or run by the one or more computing devices. In implementations, the one or more computing devices may be located in a single place or distributed among a plurality of network devices over a network.

By way of example and not limitation, the recording apparatus 700 may be integrated into a recording production line, and the recording apparatus 700 may include a third sending unit 701 configured to send a recording request to a recording and verification apparatus, wherein the recording request is used for requesting the recording and verification apparatus to assign an identity identifier and a device key to an IoT device to be recorded, and the device key includes a device private key and a device public key; a recording unit configured to record the identity identifier and the device private key into the IoT device in response to the identity identifier and the device key sent by the recording and verification apparatus; and a result returning unit 702 configured to return a recording result to the recording and verification apparatus, the recording result being used for indicating a correspondence relationship between the IoT device and the identity identifier and the device private key that are recorded.

In implementations, the apparatus 700 may include one or more processors 703, an input/output (I/O) interface 704, a network interface 705, and memory 706. The memory 706 may include a form of computer readable media such as the one described in the foregoing description.

In implementations, the memory 706 may include program units 707 and program data 708. The program units 707 may include one or more units as described in the foregoing description and shown in FIG. 7.

The embodiments of the present disclosure further provide an identity authentication system for an Internet of Things device. The identity authentication system may include an identity authentication platform, an Internet of Things device, and an Internet of Things service platform. The identity authentication platform includes the recording and verification apparatus as shown in FIG. 5 and the identity authentication apparatus as shown in FIG. 6. In the identity authentication system, after the IoT device initiates an IoT service request to the IoT service platform, the IoT service platform sends an authorization code in the service request to the identity authentication platform. The identity authentication apparatus in the identity authentication platform performs verification on the authorization code to verify whether an identity of the IoT device is legitimate, and notifies a verification result to the IoT service platform if being legitimate, so that the IoT service platform provides an IoT service to the IoT device. Therefore, compared with the existing technologies, the present embodiment realizes identity authentication of the IoT device using the authorization code, and the authorization code is generated by the IoT device based on a device private key recorded in a trusted execution environment and a random number generated by the identity authentication apparatus. Therefore, the likelihood of being maliciously copied is greatly reduced, thereby improving the security of identity authentication of the IoT device and the security of the IoT service.

It should be noted that various embodiments in the specification are described in a progressive manner, and each embodiment focuses on aspects that are different from those of other embodiments. The same and similar parts between the embodiments are referenced to each other. Due to their basic similarities to the method embodiments, the description of the apparatus embodiments is relatively simple, and relevant parts can be referenced to the description of the method embodiments.

Finally, it should also be noted that relational terms such as first and second in the present text are used merely for distinguishing one entity or operation from another entity or operation, and do not necessarily require or imply any existence of such type of relationship or order between these entities or operations. Furthermore, the term "including" or "containing" or any other variations thereof is intended to cover a non-exclusive inclusion, such that a process, method, article, or device that includes a series of elements includes not only those elements but also other elements that are not explicitly listed, or elements that are inherent to such process, method, article, or device. Without further limitation, an element defined by a phrase "comprising a . . . " does not exclude a presence of other equivalent elements in a process, method, article, or device that includes the element.

The methods and apparatuses for recording and identity authentication of an Internet of Things device provided by the present disclosure are described in detail above. The present text uses specific examples for illustrating principles and implementations of the present disclosure. The description of the foregoing embodiments is only meant to facilitate understanding of the methods and core ideas of the present disclosure. Furthermore, for those skilled in the art, there will be changes in the specific implementations and the scope of application based on the ideas of the present disclosure. In short, the content of the present specification should be construed as limitations of the present disclosure.

The present disclosure can be further understood using the following clauses.

Clause 1: A method for verifying and recording an Internet of Things (IoT) device, which is applied to a recording and verification apparatus, the method comprising: a recording and verification apparatus receiving a recording request sent by a recording production line, the recording request being used for requesting the recording and verification apparatus to assign an identity identifier and a device key to an IoT device to be recorded, and the device key comprising a device private key and a device public key; the recording and verification apparatus verifying whether the recording request is legitimate, and assigning the identity identifier and the device key to the IoT device to be recorded if affirmative; and the recording and verification apparatus sending the identity identifier and the device private key to the recording production line, so that the recording production line records the identity identifier and the device private key into the IoT device.

Clause 2: The method of Clause 1, wherein the device key comprises the device private key and the device public key, and after the recording production line records the identity identifier and the device private key into the IoT device, the method further comprises: the recording and verification apparatus receiving a recording result returned by the recording production line, wherein the recording result is used for indicating a correspondence relationship between the IoT device and the identity identifier and the device private key that are recorded; and the recording and verification apparatus sending the recording result to an identity authentication apparatus, so that the identity authentication apparatus verifies whether the device private key of the IoT device is legitimate based on the recording result when authenticating the IoT device.

Clause 3: The method of Clause 1, wherein the recording and verification apparatus sending the identity identifier and the device private key to the recording production line, so that the recording production line records the identity identifier and the device private key into the IoT device, comprises: the recording and verification apparatus sending the identity identifier and the device private key to the recording production line, so that recording production line records the identity identifier and the device private key into the IoT device in a trusted execution environment, wherein the IoT device has a separate storage space that acts as the trusted execution environment.

Clause 4: A method for recording an Internet of Things (IoT) device, which is applied to a recording production line, the method comprising: sending a recording request to a recording and verification apparatus, wherein the recording request is used for requesting the recording and verification apparatus to assign an identity identifier and a device key to an IoT device to be recorded, and the device key includes a device private key and a device public key; recording the identity identifier and the device private key into the IoT device in response to the identity identifier and the device key sent by the recording and verification apparatus; and returning a recording result to the recording and verification apparatus, the recording result being used for indicating a correspondence relationship between the IoT device and the identity identifier and the device private key that are recorded.

Clause 5: An identity authentication method for an Internet of Things (IoT) device, wherein the method is applied to an identity authentication apparatus in an identity authentication platform, the identity authentication platform is located in an identity authentication system, the identity authentication system further comprises an IoT service platform and an IoT device, the IoT service platform is used for providing an IoT service to the IoT device, and the method comprises: the identity authentication apparatus generating a random number according to a request identifier in a request for random number generation in response to the request for random number generation sent by the IoT device to the identity authentication apparatus, the IoT device having an independent storage space which acts as a trusted execution environment, and a device private key and an identity identifier of the IoT device being recorded in the trusted execution environment; the identity authentication apparatus sending the random number to the IoT device, so that the IoT device generates an authorization code based on the random number and the device private key, and initiates a service request to an IoT service platform, the service request including a service content and the authorization code; the identity authentication apparatus verifying whether the authorization code is legitimate in response to the authorization code sent by the IoT service platform to the identity authentication apparatus; and the identity authentication apparatus confirming that an identity of the IoT device is legitimate if affirmative, and the identity authentication apparatus confirming that the identity of the IoT device is illegitimate if not.

Clause 6: The method of Clause 5, wherein the authorization code comprises the device private key and the random number, and the identity authentication apparatus verifying whether the authorization code is legitimate in response to the authorization code sent by the IoT service platform to the identity authentication apparatus comprises: the identity authentication apparatus verifying whether the random number in the authorization code sent by the IoT service platform is consistent with the generated random number, and whether the device private key is the device private key included in a recording result sent by a recording and verification apparatus.

Clause 7: The method of Clause 5, wherein: when the identity of the IoT device is legitimate, the method further comprises: the identity authentication apparatus sending a session key generation instruction to the IoT service platform, wherein the session key generation instruction is used for instructing the IoT service platform to generate a session key; and the identity authentication apparatus sending the session key returned by the IoT service platform to the IoT device, so that the IoT server platform and the IoT device conduct communications using the session key.

Clause 8: The method of Clause 5, further comprising the identity authentication apparatus deleting the recording result related to the identity identifier or the device private key that is leaked in an event that the identity identifier or the device private key is leaked from the trusted execution environment.

Clause 9: The method of Clause 5, further comprising the identity authentication apparatus deleting the identity identifier and the device private key recorded in the IoT device in an event that the identity identifier or the device private key is leaked from the trusted execution environment.

Clause 10: A recording and verification apparatus for an Internet of Things (IoT) device, the recording and verification apparatus comprising: a first receiving unit configured to receive a recording request sent by a recording production line, the recording request being used for requesting the recording and verification apparatus to assign an identity identifier and a device key to an IoT device to be recorded, and the device key including a device private key and a device public key; a license verification unit configured to verify whether the recording request is legitimate; an allocation unit configured to the identity identifier and the device key to the IoT device to be recorded if a result of the license verification unit is affirmative; and a first sending unit configured to send the identity identifier and the device private key to the recording production line, so that the recording production line records the identity identifier and the device private key into the IoT device.

Clause 11: The apparatus of Clause 10, further comprising: a second receiving unit configured to a recording result returned by the recording production line, wherein the recording result is used for indicating a correspondence relationship between the IoT device and the identity identifier and the device private key that are recorded; and a second sending unit configured to send the recording result to an identity authentication apparatus, so that the identity authentication apparatus verifies whether the device private key of the IoT device is legitimate based on the recording result when authenticating the IoT device.

Clause 12: The apparatus of Clause 10, wherein first sending unit is specifically configured to send the identity identifier and the device private key to the recording production line, so that recording production line records the identity identifier and the device private key into the IoT device in a trusted execution environment, wherein the IoT device has a separate storage space that acts as the trusted execution environment.

Clause 13: A recording apparatus for an Internet of Things (IoT) device, the apparatus comprising: a third sending unit configured to send a recording request to a recording and verification apparatus, wherein the recording request is used for requesting the recording and verification apparatus to assign an identity identifier and a device key to an IoT device to be recorded, and the device key includes a device private key and a device public key; a recording unit configured to record the identity identifier and the device private key into the IoT device in response to the identity identifier and the device key sent by the recording and verification apparatus; and a result returning unit configured to return a recording result to the recording and verification apparatus, the recording result being used for indicating a correspondence relationship between the IoT device and the identity identifier and the device private key that are recorded.

Clause 14: An identity authentication apparatus for the Internet of Things (IoT) device, wherein the identity authentication apparatus is integrated into an identity authentication platform, the identity authentication platform is located in an identity authentication system, the identity authentication system further comprises an IoT service platform and an IoT device, the IoT service platform is configured to provide an IoT service to the IoT device, and the identity authentication apparatus comprises: a random number generation unit configured to generate a random number according to a request identifier in a request for random number generation in response to the request for random number generation sent by the IoT device to the identity authentication apparatus, the IoT device having an independent storage space which acts as a trusted execution environment, and a device private key and an identity identifier of the IoT device being recorded in the trusted execution environment; a random number sending unit configured to send the random number to the IoT device, so that the IoT device generates an authorization code based on the random number and the device private key, and initiates a service request to an IoT service platform, the service request including a service content and the authorization code; an authorization code verification unit configured to verify whether the authorization code is legitimate in response to the authorization code sent by the IoT service platform to the identity authentication apparatus; a first confirmation unit configured to confirm that an identity of the IoT device is legitimate if a result of the authorization code verification unit is positive; and a second confirmation unit configured to confirm that the identity of the IoT device is illegitimate if the result of the authorization code verification unit is negative.

Clause 15: The apparatus of Clause 14, wherein the authorization code verification unit comprises a verification subunit configured to verify whether the random number in the authorization code sent by the IoT service platform is consistent with the generated random number, and whether the device private key is the device private key included in a recording result sent by a recording and verification apparatus.

Clause 16: The apparatus of Clause 14, further comprising: a fourth sending unit configured to send a session key generation instruction to the IoT service platform, wherein the session key generation instruction is used for instructing the IoT service platform to generate a session key; and a fifth sending unit configured to send the session key returned by the IoT service platform to the IoT device, so that the IoT server platform and the IoT device conduct communications using the session key.

Clause 17: The apparatus of Clause 14, further comprising a first deletion unit configured to delete the recording result related to the identity identifier or the device private key that is leaked in an event that the identity identifier or the device private key is leaked from the trusted execution environment.

Clause 18: The apparatus of Clause 14, further comprising a second deletion unit configured to delete the identity identifier and the device private key recorded in the IoT device in an event that the identity identifier or the device private key is leaked from the trusted execution environment.

Clause 19: An identity authentication system for an Internet of Things (IoT) device, the identity authentication system comprising an identity authentication platform, an IoT device, and an IoT platform, wherein he identity authentication platform comprises the recording and verification apparatus of any one of Clauses 10-12, and the identity authentication apparatus of any one of Clauses 14-18.

What is claimed is:

1. A method implemented by a recording and verification apparatus comprising one or more computing devices, the method comprising:
   receiving a recording request sent by a recording production line, the recording request being used for requesting the recording and verification apparatus to assign an identity identifier and a device key to a device to be recorded, the device key comprising a device private key and a device public key;
   verifying that the recording request is legitimate;
   assigning the identity identifier and the device key to the device to be recorded;
   sending the identity identifier and the device private key to the recording production line, so that the recording production line records the identity identifier and the device private key into the device; and
   receiving a recording result returned by the recording production line after the recording production line records the identity identifier and the device private key into the device, the recording result being used for indicating a correspondence relationship between the device and the identity identifier and the device private key that are recorded.

2. The method of claim 1, further comprising:
   sending the recording result to an identity authentication apparatus, so that the identity authentication apparatus verifies that the device private key of the device is legitimate based on the recording result when authenticating the device.

3. The method of claim 1, wherein the sending the identity identifier and the device private key to the recording production line comprises:
   sending the identity identifier and the device private key to the recording production line, so that the recording production line records the identity identifier and the device private key into the device in a trusted execution environment, wherein the device has a separate storage space that acts as the trusted execution environment.

4. The method of claim 1, further comprising:
receiving a recording license that is sent by the recording production line; and
verifying that the recording license is legitimate by comparing the received recording license with a pre-stored recording license.

5. The method of claim 1, further comprising:
maintaining an identity information table including a plurality of identity identifiers to be assigned and respective device keys corresponding to the plurality of identity identifiers to be assigned; and
sequentially obtaining the identity identifier and the device key from the information table for allocating to the device.

6. The method of claim 1, wherein the device is an Internet of Thing (IoT) device.

7. One or more computer readable media storing executable instructions that, when executed by one or more processors of a recording and verification apparatus, cause the one or more processors to perform acts comprising:
receiving a recording request sent by a recording production line, the recording request being used for requesting the recording and verification apparatus to assign an identity identifier and a device key to a device to be recorded, the device key comprising a device private key and a device public key;
verifying that the recording request is legitimate;
assigning the identity identifier and the device key to the device to be recorded;
sending the identity identifier and the device private key to the recording production line, so that the recording production line records the identity identifier and the device private key into the device; and
receiving a recording result returned by the recording production line after the recording production line records the identity identifier and the device private key into the device, the recording result being used for indicating a correspondence relationship between the device and the identity identifier and the device private key that are recorded.

8. The one or more computer readable media of claim 7, the acts further comprising:
sending the recording result to an identity authentication apparatus, so that the identity authentication apparatus verifies that the device private key of the device is legitimate based on the recording result when authenticating the device.

9. The one or more computer readable media of claim 7, wherein the sending the identity identifier and the device private key to the recording production line comprises:
sending the identity identifier and the device private key to the recording production line, so that the recording production line records the identity identifier and the device private key into the device in a trusted execution environment, wherein the device has a separate storage space that acts as the trusted execution environment.

10. The one or more computer readable media of claim 7, the acts further comprising:
receiving a recording license that is sent by the recording production line; and
verifying that the recording license is legitimate by comparing the received recording license with a pre-stored recording license.

11. The one or more computer readable media of claim 7, the acts further comprising:
maintaining an identity information table including a plurality of identity identifiers to be assigned and respective device keys corresponding to the plurality of identity identifiers to be assigned; and
sequentially obtaining the identity identifier and the device key from the information table for allocating to the device.

12. An apparatus comprising:
one or more processors; and
one or more computer readable media storing executable instructions that, when executed by the one or more processors, cause the one or more processors to perform acts comprising:
receiving a recording request sent by a recording production line, the recording request being used for requesting a recording and verification apparatus to assign an identity identifier and a device key to a device to be recorded, the device key comprising a device private key and a device public key;
verifying that the recording request is legitimate;
assigning the identity identifier and the device key to the device to be recorded; and
sending the identity identifier and the device private key to the recording production line, so that the recording production line records the identity identifier and the device private key into the device; and
receiving a recording result returned by the recording production line after the recording production line records the identity identifier and the device private key into the device, the recording result being used for indicating a correspondence relationship between the device and the identity identifier and the device private key that are recorded.

13. The apparatus of claim 12, wherein the acts further comprise:
sending the recording result to an identity authentication apparatus.

14. The apparatus of claim 12, wherein the sending the identity identifier and the device private key to the recording production line comprises:
sending the identity identifier and the device private key to the recording production line.

15. The apparatus of claim 14, wherein the recording production line records the identity identifier and the device private key into the device in a trusted execution environment.

16. The apparatus of claim 12, wherein the acts further comprise:
receiving a recording license that is sent by the recording production line; and
verifying that the recording license is legitimate by comparing the received recording license with a pre-stored recording license.

17. The apparatus of claim 12, wherein the acts further comprise:
maintaining an identity information table including a plurality of identity identifiers to be assigned and respective device keys corresponding to the plurality of identity identifiers to be assigned; and
sequentially obtaining the identity identifier and the device key from the information table for allocating to the device.

18. The apparatus of claim 13, wherein the identity authentication apparatus verifies that the device private key of the device is legitimate based on the recording result.

19. The apparatus of claim 15, wherein the device has a separate storage space that acts as the trusted execution environment.

20. The apparatus of claim 12, wherein the device is an Internet of Thing (IoT) device.

\* \* \* \* \*